United States Patent
Peng et al.

(10) Patent No.: US 11,787,716 B2
(45) Date of Patent: Oct. 17, 2023

(54) APPARATUS AND METHOD FOR ADVANCED NITROGEN AND PHOSPHORUS REMOVAL OF DOMESTIC SEWAGE BASED ON DEAMOX IN AOAO PROCESS WITH SLUDGE DOUBLE-REFLUX

(71) Applicant: BEIJING UNIVERSITY OF TECHNOLOGY, Beijing (CN)

(72) Inventors: Yongzhen Peng, Beijing (CN); Yan Feng, Beijing (CN); Bo Liu, Beijing (CN); Lei Wu, Beijing (CN)

(73) Assignee: Beijing University of Technology, Beijing (CN)

( * ) Notice: Subject to any disclaimer, the term of this patent is extended or adjusted under 35 U.S.C. 154(b) by 480 days.

(21) Appl. No.: 17/041,354

(22) PCT Filed: Apr. 2, 2020

(86) PCT No.: PCT/CN2020/082878
§ 371 (c)(1),
(2) Date: Sep. 24, 2020

(87) PCT Pub. No.: WO2021/051781
PCT Pub. Date: Mar. 25, 2021

(65) Prior Publication Data
US 2023/0114714 A1   Apr. 13, 2023

(30) Foreign Application Priority Data

Sep. 16, 2019 (CN) .......................... 201910871105.7

(51) Int. Cl.
*C02F 3/30* (2023.01)
*C02F 3/34* (2023.01)
(Continued)

(52) U.S. Cl.
CPC .............. *C02F 3/307* (2013.01); *C02F 3/308* (2013.01); *C02F 3/341* (2013.01);
(Continued)

(58) Field of Classification Search
CPC .. C02F 3/307; C02F 3/308; C02F 3/34; C02F 2101/105; C02F 2101/16; C02F 2203/006; C02F 2209/44
(Continued)

(56) References Cited

U.S. PATENT DOCUMENTS 3,964,998 A * 6/1976 Barnard ................ C02F 3/1257
210/906
5,022,993 A * 6/1991 Williamson ............ C02F 3/308
210/615
(Continued)

FOREIGN PATENT DOCUMENTS

CN       105753153       7/2016
CN       106938863       7/2017
(Continued)

OTHER PUBLICATIONS

Machine-generated English translation of CN 110028158, generated on Feb. 16, 2023.*
(Continued)

*Primary Examiner* — Fred Prince
(74) *Attorney, Agent, or Firm* — GREENBERG TRAURIG, LLP

(57) ABSTRACT

A method for advanced nitrogen and phosphorus removal of domestic sewage based on DEAMOX in AOAO process with sludge double-reflux is disclosed. The method comprises allowing domestic sewage and returned sludge of the secondary sedimentation tank (3) to enter the anaerobic zone (2.1) of the AOAO reactor (2), firstly performing partial (Continued)

denitrification by the denitrifying bacteria, reducing nitrate-nitrogen in the returned sludge to nitrite-nitrogen, then converting ammonia-nitrogen and nitrite-nitrogen into nitrogen by anammox bacteria, and phosphate accumulating bacteria and denitrifying phosphate accumulating organisms performing anaerobic phosphate release and storing internal carbon source; then allowing part of the mixed liquid to enter the intermediate aerobic zone (2.2) of the AOAO bioreactor (2) to carry out phosphate uptake and nitrification reaction, allowing another part of the mixed liquid to enter the anoxic zone (2.3) of the AOAO bioreactor (2), at same time allowing all the mixed liquid of the intermediate aerobic zone (2.2) and part of returned sludge of the secondary sedimentation tank (3) to enter the anoxic zone (2.3), using the internal carbon source stored in the anaerobic compartment and the internal carbon source in the returned sludge to carry out partial denitrification, anammox, denitrifying dephosphatation, and then allowing the mixed liquid to enter the post aerobic zone (2.4) and subsequently enter the secondary sedimentation tank (3) for mud-water separation. An apparatus for advanced nitrogen and phosphorus removal of domestic sewage based on DEAMOX in AOAO process with sludge double-reflux is also disclosed.

2 Claims, 1 Drawing Sheet

(51) Int. Cl.
  *C02F 101/10* (2006.01)
  *C02F 101/16* (2006.01)
(52) U.S. Cl.
  CPC .... *C02F 2101/105* (2013.01); *C02F 2101/16* (2013.01); *C02F 2203/006* (2013.01); *C02F 2209/44* (2013.01)

(58) Field of Classification Search
  USPC ....... 210/605, 615, 616, 617, 622, 623, 259, 210/903, 906
  See application file for complete search history.

(56) References Cited

U.S. PATENT DOCUMENTS

| | | | |
|---|---|---|---|
| 6,946,073 B2* | 9/2005 | Daigger | ................ C02F 3/1215 210/906 |
| 7,510,655 B2* | 3/2009 | Barnes | .................... C02F 3/006 210/906 |
| 7,537,698 B2 | 5/2009 | Sumino et al. | |
| 7,540,959 B2 | 6/2009 | Sumino et al. | |
| 7,550,082 B2 | 6/2009 | Sumino et al. | |
| 7,550,083 B2 | 6/2009 | Sumino et al. | |
| 7,575,679 B2 | 8/2009 | Sumino et al. | |
| 2006/0191846 A1 | 8/2006 | Sumino et al. | |
| 2008/0164187 A1 | 7/2008 | Sumino et al. | |
| 2008/0164196 A1 | 7/2008 | Sumino et al. | |
| 2009/0008308 A1 | 1/2009 | Sumino et al. | |
| 2009/0008313 A1 | 1/2009 | Sumino et al. | |

FOREIGN PATENT DOCUMENTS

| | | | |
|---|---|---|---|
| CN | 109485152 | | 3/2019 |
| CN | 110028158 A | * | 7/2019 |
| CN | 110615531 | | 12/2019 |
| EP | 1840091 | | 9/2010 |

OTHER PUBLICATIONS

PCT International Search Report, issued in connection to patent application No. PCT/CN2020/082878; dated Jun. 28, 2020; 6 pages; China.

PCT Written Opinon of the International Searching Authority, issued in connection to patent application No. PCT/CN2020/082878; dated Jun. 28, 2020; 8 pages; China.

* cited by examiner

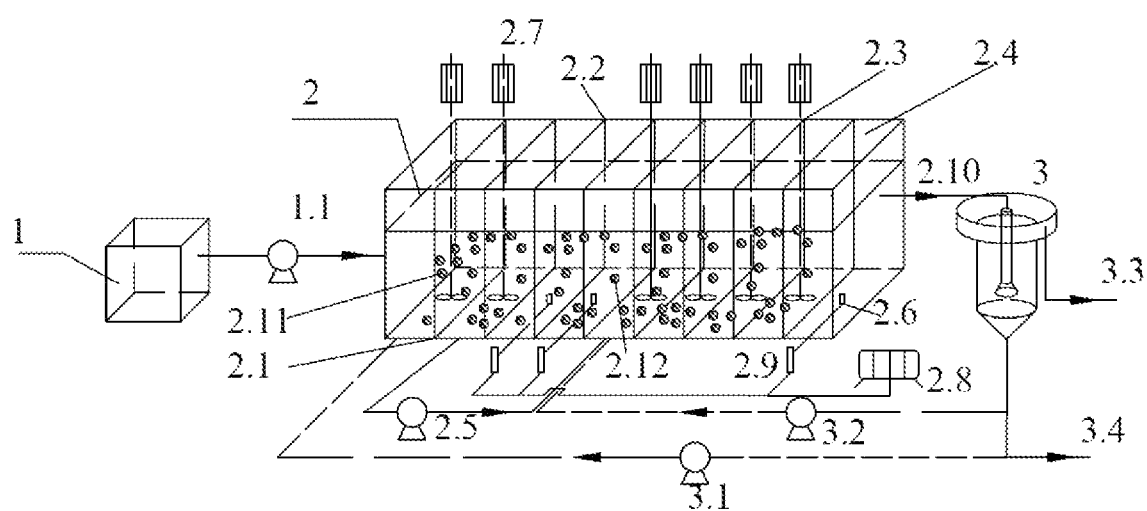

APPARATUS AND METHOD FOR ADVANCED NITROGEN AND PHOSPHORUS REMOVAL OF DOMESTIC SEWAGE BASED ON DEAMOX IN AOAO PROCESS WITH SLUDGE DOUBLE-REFLUX

RELATED APPLICATIONS

This application is a national phase filing under 35 USC 371 of International Application No. PCT/CN2020/082878, filed on Apr. 2, 2020, which claims priority of Chinese Patent Application No. 201910871105.7, filed on Sep. 16, 2019, the entirety of which are incorporated herein by reference for all purposes.

TECHNICAL FIELD

The invention relates to an apparatus and method for advanced nitrogen and phosphorus removal of sewage based on denitrifying ammonium oxidation (DEAMOX) in anaerobic/aerobic/anoxic/aerobic (AOAO) process with sludge double-reflux, which belongs to the technical field of sewage treatment, and is suitable for the field of sewage treatment, such as newly-built wastewater treatment plants or upgrading and reconstruction of old wastewater plants, municipal wastewater treatment and industrial wastewater treatment.

BACKGROUND

In domestic sewage treatment, the removal of nitrogen is the most difficult problem for sewage to solve, and it is also the key to achieving the standard discharge of sewage advanced treatment. According to the principle of denitrification, it can be divided into physical and chemical denitrification and biological denitrification. Compared with physical and chemical method, biological method has the characteristics of economic efficiency and wide application in the treatment of nitrogen-containing wastewater. At the same time, biological nitrogen removal technology has great development potential. Therefore, only biological nitrogen removal is the most reasonable and feasible measure to remove nitrogen in sewage.

The anammox (anaerobic ammonium oxidation) is a reaction in which anammox bacteria use ammonia-nitrogen as an electron donor to reduce nitrite-nitrogen to nitrogen under anoxic conditions. Anammox, as an efficient biological denitrification process, has good development and application prospects due to its high nitrogen removal efficiency. The research on an anammox process started at the end of the $20^{th}$ century and was successfully developed at the beginning of the $21^{st}$ century. At present, there have been many successful cases in the treatment of high-concentration ammonia-nitrogen wastewater such as landfill leachate and sludge digestion liquid.

Partial denitrification is to control the product of the reduction process of nitrate-nitrogen ($NO_3^-$—N) to nitrite-nitrogen ($NO_2^-$—N). Compared with short-cut nitrification, partial denitrification is less affected by external environment changes, and can stably realize accumulation of nitrite, thereby providing a substrate for the anammox reaction. Compared with traditional complete denitrification, partial denitrification has the advantages of faster nitrogen conversion rate, lower sludge yield, and less carbon source demand. Endogenous denitrification refers to a process in which heterotrophic denitrifying bacteria use endogenous substances stored in the body as electron donors to reduce nitrate-nitrogen or nitrite-nitrogen to nitrogen. Domestic sewage contains a large amount of ammonia-nitrogen, which can be used as one of the substrates of the anammox reaction, it is possible for partial denitrification coupled with anammox. Therefore, partial anammox with partial denitrification can achieve efficient treatment of domestic sewage and improve the effluent quality.

The obvious feature of domestic sewage is low C/N water quality, which generally cannot meet the requirements for nitrogen and phosphorus removal at the same time. Denitrifying dephosphatation is a process in which the use of denitrifying phosphate accumulating bacteria to release phosphate in an anaerobic environment while volatile fatty acids (VFA) in the domestic sewage is absorbed into the cell to synthesize intracellular carbon sources (PHAs). In anoxic environment, excessive phosphate in the water is absorbed into cell with nitrate-nitrogen and PHAs as the electron acceptor and electron donor, respectively. The biggest advantage of denitrifying dephosphatation is "one-carbon dual-use", thus saving carbon source.

SUMMARY

The invention provides an apparatus and method for advanced nitrogen and phosphorus removal of domestic sewage based on DEAMOX in AOAO process with sludge double-reflux. Through the "anaerobic/aerobic/anoxic/aerobic" AOAO operation mode, a nitrite substrate is provided by the partial denitrification reaction for anammox autotrophic nitrogen removal, and attachment conditions are provided by the anammox filler for the growth of anammox bacteria. The storage capacity of the carbon source in the sludge and the denitrification potential of the anoxic zone are strengthened by setting a double-reflux mode of the sludge in the secondary sedimentation tank. The ineffective consumption of the carbon source during the aerobic aeration process is minimized and the carbon source is effectively used; Phosphorus removal can be achieved through anaerobic phosphate release, aerobic phosphate uptake and excess sludge discharge; a good attachment condition is provided by the biological fillers in the aerobic zone for the enrichment of nitrifying bacteria with a longer sludge retention time, which could ensure the nitrification performance of the apparatus; in the anoxic environment, denitrifying bacteria use the internal carbon source stored in anaerobic zone and contained in the part of returned sludge from the secondary sedimentation tank to perform partial denitrification, wherein nitrate-nitrogen is denitrified to nitrite-nitrogen, ammonia-nitrogen and nitrite-nitrogen are carried out an anammox reaction so as to save the cost of adding external carbon sources; the processing load is increased by a continuous flow operation mode.

The apparatus of the present application comprises a raw water tank (1), an AOAO bioreactor (2) and a secondary sedimentation tank (3) which are connected in sequence; the AOAO bioreactor (2) sequentially comprises an anaerobic zone (2.1), an intermediate aerobic zone (2.2), an anoxic zone (2.3) and a post aerobic zone (2.4); the raw water tank (1) is connected to a first compartment of the anaerobic zone (2.1) through an influent pump (1.1), the anaerobic zone (2.1) is connected to the intermediate aerobic zone (2.2), a last compartment of the anaerobic zone (2.1) is connected to a first compartment of the anoxic zone (2.3) by crossing a sludge pump (2.5), the intermediate aerobic zone (2.2) is connected to the anoxic zone (2.3), the anoxic zone (2.3) is connected to the post aerobic zone (2.4), and the post aerobic zone (2.4) is connected to the secondary sedimentation tank (3) via an overflow pipe (2.10); a bottom of the secondary sedimentation tank (3) is connected to a first compartment of the anaerobic zone (2.1) through a first sludge reflux pump (3.1), the bottom of the secondary sedimentation tank (3) is connected to the first compartment of the anoxic zone (2.3) through a second sludge reflux pump (3.2), an effluent from the secondary sedimentation tank (3) is discharged through a drainage pipe (3.3), and a sludge is regularly discharged from a sludge pipe (3.4); the anaerobic zone (2.1) and the anoxic zone (2.3) are equipped with an agitator (2.7) respectively, a aeration pump (2.8) is respectively connected to an aeration sand block (2.6) in the post aerobic zone (2.4) and the intermediate aerobic zone (2.2) through a rotormeter (2.9); an anammox filler (2.11) is placed in the anaerobic zone (2.1) and the anoxic zone (2.3) respectively with a filling ratio of 30%-40%, a suspended polyethylene biological filler (2.12) is placed in the intermediate aerobic zone (2.2) with a specific surface density of 450-500 m$^2$/m$^3$ and a filling ratio of filler of 30%-40%.

A method of applying the apparatus of claim 1, comprising the following steps:
1) allowing domestic sewage from the raw water tank (1) to enter a first compartment of the anaerobic zone (2.1) of the AOAO bioreactor (2) via the influent pump (1.1), at the same time allowing part of returned sludge pumped by the first sludge reflux pump (3.1) from the bottom of the secondary sedimentation tank (3) to enter the first compartment of the anaerobic zone (2.1) of the AOAO bioreactor (2), and controlling a hydraulic retention time in the anaerobic zone to be 2-4 h, using part of the organic matter in the influent water by the denitrifying bacteria to perform partial denitrification, and then using ammonia-nitrogen and nitrite-nitrogen by anammox bacteria on the anammox filler (2.11) in the anaerobic zone (2.1) to carry out anammox reaction, followed by storing internal carbon source by phosphate accumulating bacteria and denitrifying phosphate accumulating bacteria and performing anaerobic phosphate release reaction;
2) allowing part of a first mixed liquid from an last compartment of the anaerobic zone (2.1) to enter the aerobic zone (2.2), and controlling dissolved oxygen concentration to be 2-4 mg/L by controlling the rotormeter (2.9) and the hydraulic retention time in the aerobic zone to be 3-4 h, carrying out aerobic phosphate uptake by phosphate accumulating bacteria, and completing nitrification reaction by nitrifying bacteria;
3) allowing part of the first mixed liquid from a last compartment of the anaerobic zone (2.1) to enter a first compartment of the anoxic zone (2.3) via crossing the sludge pump (2.5), allowing of a second mixed liquid from an last compartment of the intermediate aerobic zone (2.2) to enter the first compartment of the anoxic zone (2.3), and at the same time allowing part of returned sludge pumped by the second sludge reflux pump (3.2) from the bottom of the secondary sedimentation tank (3) to enter the first compartment of the anoxic zone (2.3), controlling an average hydraulic retention time in the anoxic zone (2.3) to be 5-7 h, denitrifying phosphate accumulating bacteria playing a role in the anoxic zone (2.3), using the internal carbon source stored in the anaerobic zone and the internal carbon source in the returned sludge of the secondary sedimentation tank to carry out denitrifying dephosphatation and partial denitrification, reducing nitrate-nitrogen produced in the intermediate aerobic zone (2.2) to nitrite-nitrogen, carrying out anammox reaction of ammonia-nitrogen with nitrite-nitrogen to achieve advanced nitrogen removal;
4) allowing a third mixed liquid from the anoxic zone (2.3) to enter the post aerobic zone (2.4) to oxidize ammonia-nitrogen in the third mixed liquid and strip nitrogen gas generated in the anoxic zone (2.3), while improving sludge settling performance;
5) allowing a fourth mixed liquid from the post aerobic zone (2.4) to enter the secondary sedimentation tank (3) through the overflow pipe (2.10) to achieve the purpose of mud-water separation, discharging a supernatant in the secondary sedimentation tank (3) via the drainage pipe (3.3), returning a sludge at the bottom of the secondary sedimentation tank (3) to the first compartment of the anaerobic zone (2.1) via the first sludge reflux pump (3.1), which has a sludge reflux ratio of 70%-100%, and the sludge at the bottom of the secondary sedimentation tank (3) to the first compartment of the anoxic zone (2.3) by the second sludge return pump (3.2), which has a sludge reflux ratio of 70%-100%;

maintaining a concentration of activated sludge in the AOAO bioreactor at 3000-4000 mg/L, controlling the floc sludge retention time at 10-15 d.

The purpose of the present invention is to provide an apparatus and method for advanced nitrogen and phosphorus removal, which has the following advantages:
1) the partial denitrification reaction in the anaerobic zone and the anoxic zone provides a substrate for anammox autotrophic nitrogen removal, which reduces carbon source consumptionand improves total nitrogen removal rate;
2) anammox fillers in the anaerobic zone and the anoxic zone provide good attachment conditions for the growth of anammox bacteria and effectively prevent the loss of anammox bacteria; the nitrification filler comprising suspended polyethylene biological fillers in the aerobic zone provides attachment conditions for the growth of nitrifying bacteria and strengthen the nitrification in the aerobic zone;
3) the operation mode of the continuous flow "anaerobic/aerobic/anoxic/aerobic" strengthens the storage capacity of the internal carbon source of the sludge; the existence of surpassing sludge reduces the ineffective consumption of carbon sources in the aeration process, and provides reaction conditions for denitrifying dephosphatation in anoxic zone, which can achieve simultaneous nitrogen and phosphorus removal from domestic sewage; the sludge double-reflux mode enhances the denitrification potential in the anoxic zone and saves the addition of carbon sources in the subsequent denitrification process;
4) a continuous flow operation mode and the operation of anammox reaction realize the advanced nitrogen removal from domestic sewage, increase the processing load and facilitate the operation.

BRIEF DESCRIPTION OF THE DRAWINGS

FIG. 1 is an apparatus for advanced nitrogen and phosphorus removal of AOAO sewage based on DEAMOX sludge double-reflux.

Reference numerals in FIG. 1 are listed as follows:
1—raw water tank; 1.1—influent pump; 2—AOAO bioreactor; 2.1—anaerobic zone; 2.2—intermediate aerobic zone; 2.3—anoxic zone; 2.4—post aerobic zone; 2.5—sludge pump; 2.6—aeration sand block; 2.7—agitator; 2.8— aeration pump; 2.9—rotormeter; 2.10—overflow pipe; 2.11—anammox filler; 2.12—polyethylene biological filler; 3—secondary sedimentation tank; 3.1—first sludge reflux pump; 3.2—second sludge reflux pump; 3.3—drainage pipe; 3.4—sludge pipe.

DETAILED DESCRIPTION

With reference to FIG. 1, the embodiment of the present invention is described in detail:

1) allowing domestic sewage from the raw water tank (1) to enter a first compartment of the anaerobic zone (2.1) of the AOAO bioreactor (2) via the influent pump (1.1), at the same time allowing part of returned sludge pumped by the first sludge reflux pump (3.1) from the bottom of the secondary sedimentation tank (3) to enter the first compartment of the anaerobic zone (2.1) of the AOAO bioreactor (2), and controlling the hydraulic retention time in the anaerobic zone to be 2-4 h, using part of the organic matter in the influent water by the denitrifying bacteria to perform partial denitrification, and then using ammonia-nitrogen and nitrite-nitrogen by anammox bacteria on the anammox filler (2.11) in the anaerobic zone (2.1) to carry out anammox reaction, and then storing internal carbon source by phosphate accumulating bacteria and denitrifying phosphate accumulating organisms and being carried out anaerobic phosphate release reaction;

2) allowing part of the mixed liquid to enter the aerobic zone (2.2) from the end of the anaerobic zone (2.1), and controlling the hydraulic retention time in the aerobic zone to be 3-4 h, carrying out aerobic phosphate uptake by phosphate accumulating bacteria, and completing nitrification reaction by nitrifying bacteria;

3) allowing part of the mixed liquid to enter a first compartment of the anoxic zone (2.3) from the end of the anaerobic zone (2.1) via crossing the sludge pump (2.5), allowing all the aerobic mixed liquid to enter the first compartment of the anoxic zone (2.3) from the end of the intermediate aerobic zone (2.2), and at the same time allowing part of returned sludge pumped by the second sludge reflux pump (3.2) from the bottom of the secondary sedimentation tank (3) to enter the first compartment of the anoxic zone (2.3), controlling the average hydraulic retention time in the anoxic zone (2.3) to be 5-7 h, denitrifying phosphate accumulating organisms playing a role in the anoxic zone (2.3), using the internal carbon source stored in the anaerobic compartment and the internal carbon source in the returned sludge of the secondary sedimentation tank to carry out denitrifying dephosphatation and partial denitrification, reducing nitrate-nitrogen produced in the intermediate aerobic zone (2.2) to nitrite-nitrogen, carrying out anammox reaction of ammonia-nitrogen with nitrite-nitrogen to achieve advanced nitrogen removal;

4) allowing the mixed liquid to enter the post aerobic zone (2.4) from the anoxic zone (2.3) to oxidize ammonia-nitrogen in the mixed liquid and strip nitrogen gas generated in the anoxic zone (2.3), while improving the sludge settling performance;

5) allowing the mixed liquid to enter the secondary sedimentation tank (3) from the post aerobic zone (2.4) through the overflow pipe (2.10) to achieve the purpose of mud-water separation, discharging the supernatant in the secondary sedimentation tank (3) via the drainage pipe (3.3), returning the sludge at the bottom of the secondary sedimentation tank (3) to the first compartment of the anaerobic zone (2.1) via first sludge reflux pump (3.1), the sludge reflux ratio is 70%-100%, and returning the sludge at the bottom of the secondary sedimentation tank (3) to the first compartment of the anoxic zone (2.3) by the second sludge return pump (3.2), which has a sludge reflux ratio of 70%-100%;

maintaining the concentration of activated sludge in the AOAO bioreactor at 3000-4000 mg/L, controlling the floc sludge retention time at 10-15 d.

Taking domestic sewage from the family area of a university in Beijing as the treatment object, the performance of this system for nitrogen and phosphorus removal was investigated.

|  | COD (mg/L) | $NH_4^+$—N (mg/L) | TN (mg/L) | $PO_4^{3-}$—P (mg/L) |
| --- | --- | --- | --- | --- |
| Domestic Sewage (influent) | 180-260 | 40-50 | 50-60 | 3-6 |
| Effluent (discharge) | 35-45 | 0-3 | 6-10 | 0.1-0.5 |

The test results show that the effluent meets the first level A criteria specified in *Discharge Standard of Pollutants for Municipal Wastewater Treatment Plant* (GB 18918-2002) under the stable operation of the system.

What is claimed is:

1. An apparatus comprising:
   a raw water tank, an anaerobic/aerobic/anoxic/aerobic (AOAO) bioreactor and a secondary sedimentation tank which are connected in sequence, wherein:
   the AOAO bioreactor sequentially comprises an anaerobic zone, an intermediate aerobic zone, an anoxic zone and a post aerobic zone;
   the raw water tank is connected to a first compartment of the anaerobic zone through an influent pump;
   the anaerobic zone is connected to the intermediate aerobic zone;
   a last compartment of the anaerobic zone is connected to a first compartment of the anoxic zone by crossing a sludge pump;
   the intermediate aerobic zone is connected to the anoxic zone, the anoxic zone is connected to the post aerobic zone;
   the post aerobic zone is connected to the secondary sedimentation tank via an overflow pipe;
   a bottom of the secondary sedimentation tank is connected to a first compartment of the anaerobic zone through a first sludge reflux pump;
   the bottom of the secondary sedimentation tank is connected to the first compartment of the anoxic zone through a second sludge reflux pump;
   an effluent from the secondary sedimentation tank is discharged through a drainage pipe, and a sludge is discharged from a sludge pipe;
   the anaerobic zone and the anoxic zone are each equipped with an agitator;
   a aeration pump is respectively connected to an aeration sand block in the post aerobic zone and the intermediate aerobic zone through a rotormeter;
   an anammox filler is placed in each of the anaerobic zone and the anoxic zone with a filling ratio of 30%-40%;
   a suspended polyethylene biological filler is placed in the intermediate aerobic zone with a specific surface density of 450-500 $m^2/m^3$ and a filling ratio of 30%-40% and
   the apparatus is configured to remove nitrogen and phosphorus from domestic sewage based on denitrifying ammonium oxidation in an AOAO-bioreactor based process with a sludge double-reflux.

2. A method of applying the apparatus of claim 1 comprising:
1) Allowing domestic sewage from the raw water tank to enter a first compartment of the anaerobic zone of the AOAO bioreactor via the influent pump, at the same time allowing part of returned sludge pumped by the first sludge reflux pump from the bottom of the secondary sedimentation tank to enter the first compartment of the anaerobic zone of the AOAO bioreactor, and controlling a hydraulic retention time in the anaerobic zone to be 2-4 h, using part of organic matter in influent water by the denitrifying bacteria to perform partial denitrification, and then using ammonia-nitrogen and nitrite-nitrogen by anammox bacteria on the anammox filler in the anaerobic zone to carry out anammox reaction, followed by storing internal carbon source by phosphate accumulating bacteria and denitrifying phosphate accumulating bacteria and performing anaerobic phosphate release reaction;
2) Allowing part of a first mixed liquid from aw last compartment of the anaerobic zone to enter the intermediate aerobic zone, and controlling dissolved oxygen concentration to be 2-4 mg/L by controlling the rotormeter and the hydraulic retention time in the intermediate aerobic zone to be 3-4 h, carrying out aerobic phosphate uptake by phosphate accumulating bacteria, and completing nitrification reaction by nitrifying bacteria;
3) allowing part of the first mixed liquid from a last compartment of the anaerobic zone to enter a first compartment of the anoxic zone via crossing the sludge pump, allowing all of a second mixed liquid from a last compartment of the intermediate aerobic zone to enter the first compartment of the anoxic zone, and at the same time allowing part of returned sludge pumped by the second sludge reflux pump from the bottom of the secondary sedimentation tank to enter the first compartment of the anoxic zone, controlling an average hydraulic retention time in the anoxic zone to be 5-7 h, denitrifying phosphate accumulating bacteria playing a role in the anoxic zone, using the internal carbon source stored in the anaerobic zone and the internal carbon source in the returned sludge of the secondary sedimentation tank to carry out denitrifying dephosphatation and partial denitrification, reducing nitrate-nitrogen produced in the intermediate aerobic zone to nitrite-nitrogen, carrying out anammox reaction of ammonia-nitrogen with nitrite-nitrogen to achieve advanced nitrogen removal;
4) allowing a third mixed liquid from the anoxic zone to enter the post aerobic zone to oxidize ammonia-nitrogen in the third mixed liquid and strip nitrogen gas generated in the anoxic zone, while improving sludge settling performance;
5) allowing a fourth mixed liquid from the post aerobic zone to enter the secondary sedimentation tank through the overflow pipe to achieve a purpose of mud-water separation, discharging a supernatant in the secondary sedimentation tank via the drainage pipe, returning a sludge at the bottom of the secondary sedimentation tank to the first compartment of the anaerobic zone via the first sludge reflux pump, which has a sludge reflux ratio of 70%-100%, and the sludge at the bottom of the secondary sedimentation tank is returned to the first compartment of the anoxic zone by the second sludge return pump, which has a sludge reflux ratio of 70%-100%;
6) maintaining a concentration of activated sludge in the AOAO bioreactor at 3000-4000 mg/L, controlling floc sludge retention time at 10-15 d.

* * * * *